(12) United States Patent
Müller et al.

(10) Patent No.: US 11,472,423 B2
(45) Date of Patent: Oct. 18, 2022

(54) SYSTEM FOR CONTROLLING A SELF-DRIVING VEHICLE

(71) Applicant: Volkswagen Aktiengesellschaft, Wolfsburg (DE)

(72) Inventors: Julian-Steffen Müller, Hanover (DE); Fabian Plinke, Hamburg (DE); Andreas Braasch, Wuppertal (DE); Johannes Heinrich, Cologne (DE); Timo Horeis, Hamburg (DE); Tobias Kain, Oberndorf/Melk (AT); Maximilian Wesche, Edemissen (DE); Hendrik Decke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/105,429

(22) Filed: Nov. 25, 2020

(65) Prior Publication Data
US 2021/0237750 A1 Aug. 5, 2021

(30) Foreign Application Priority Data
Dec. 2, 2019 (DE) .......................... 102019218718.8

(51) Int. Cl.
*B60W 50/029* (2012.01)
*B60W 60/00* (2020.01)
(Continued)

(52) U.S. Cl.
CPC ........ *B60W 50/029* (2013.01); *B60W 50/035* (2013.01); *B60W 50/038* (2013.01);
(Continued)

(58) Field of Classification Search
CPC ............ B60W 50/029; B60W 50/035; B60W 50/038; B60W 60/0051;
(Continued)

(56) References Cited

U.S. PATENT DOCUMENTS 5,550,736 A 8/1996 Hay et al.
7,760,080 B2 7/2010 Breed et al.
(Continued)

FOREIGN PATENT DOCUMENTS

CN 101857008 A 10/2010
DE 10142511 A1 4/2003
(Continued)

*Primary Examiner* — Marthe Y Marc-Coleman
(74) *Attorney, Agent, or Firm* — Loza & Loza, LLP; Peter Zura

(57) ABSTRACT

A self-driving motor vehicle including numerous control units and numerous program codes for controlling the functions of the autonomous driving and other functions of the self-driving vehicle. Numerous program codes used for an autonomous driving mode are applied redundantly to at least two different control units. The self-driving motor vehicle may then be operated in an at least a partially autonomous driving mode. In this mode, the functions directly needed for satisfying a passenger's desire are determined, and weighted with regard to their importance in fulfilling the passenger's desires. At least one function of a lower order is then shut off, if the available resources in functioning control units and/or the power level in the self-driving motor vehicle are insufficient to execute program code for executing this function of the lower order.

20 Claims, 3 Drawing Sheets

(51) Int. Cl.
*B60W 50/035* (2012.01)
*B60W 50/038* (2012.01)
*G05D 1/00* (2006.01)

(52) U.S. Cl.
CPC . *B60W 60/0051* (2020.02); *B60W 2050/0292* (2013.01); *G05D 1/0061* (2013.01)

(58) Field of Classification Search
CPC ... B60W 2050/0006; B60W 2050/065; B60W 50/023; B60W 60/00; B60W 50/0205; B60W 50/12; G05D 1/0061
See application file for complete search history.

(56) References Cited

U.S. PATENT DOCUMENTS

| | | |
|---|---|---|
| 7,808,892 B1 | 10/2010 | Babcock et al. |
| 8,560,609 B2 | 10/2013 | Nathanson |
| 9,648,023 B2 | 5/2017 | Hoffman |
| 2013/0145482 A1 | 6/2013 | Ricci et al. |
| 2018/0231974 A1* | 8/2018 | Eggert ................ B60W 30/085 |
| 2019/0049958 A1* | 2/2019 | Liu .......................... G01S 17/89 |
| 2021/0163021 A1* | 6/2021 | Frazzoli .................. H04W 4/00 |

FOREIGN PATENT DOCUMENTS

| | | |
|---|---|---|
| DE | 102005013440 A1 | 10/2006 |
| DE | 102011086530 A1 | 5/2012 |
| DE | 102018201119 A1 | 7/2019 |
| WO | 2005055056 A1 | 6/2005 |
| WO | 2017127639 A | 7/2017 |

* cited by examiner

SYSTEM FOR CONTROLLING A SELF-DRIVING VEHICLE

RELATED APPLICATIONS

The present application claims priority to German Patent Application No. DE 102019218718.8 to Müller et al., titled "System for Controlling a Self-Driving Vehicle" filed Dec. 2, 2019, the contents of which is incorporated by reference in its entirety herein.

BACKGROUND

The present disclosure relates to a control system for controlling the operation of a self-driving motor vehicle, in particular a driving system that controls the automatic driving of the motor vehicle, a motor vehicle that has such a control system, in particular an electrically driven motor vehicle, and associated computer programs.

Today's vehicles already have numerous computer-based assistance systems that assist the driver in numerous driving situations. These assistance systems use sensors to obtain measurement data that are much more sensitive than humans. These assistance systems also react significantly faster than humans. Known driver assistance systems include, for example, lane keeping assistance, braking assistance upon detecting pedestrians, and adaptive cruise control, in particular for heavy traffic.

By using these assistance systems, the autonomy of the driver with regard to driving decisions is increasingly transferred to the vehicle, and/or the control units therein. The result of these developments is a self-driving vehicle that can maneuver without any intervention from a person. Such a self-driving vehicle enables fully automated passenger transportation.

A driving system controls the operation of a self-driving automobile, which is understood in general herein to be a control unit designed and configured specifically for this. This control unit is configured to automatically control the vehicle laterally and longitudinally using numerous input signals, in particular sensor data collected by the vehicle itself, as well as communication data that has been received. Such an automatic lateral and longitudinal control of the vehicle requires complex calculations on the part of the driving system, which normally has algorithms, models and control functions for this, based at least in part on machine learning (artificial intelligence).

Numerous interacting software applications are needed to safely operate an autonomous automobile. The problem, however, is that errors, e.g. a software error or a computing node error, may mean that some applications can no longer be executed. Depending on the importance of the application, this can have dramatic consequences regarding the safety of the passengers and other road users.

In order to avoid tragic consequences due to errors, the software applications can be executed redundantly at various computing nodes. The idea is that the redundancies can be carried out in a passive mode. This means that they carry out the same procedures as the active entities, but without interacting with the systems that are executing them.

Depending on the relevancy of the function in question, this could result in uncontrolled driving states, and may cause discomfort or even endanger the passengers of the autonomously driven motor vehicle. Safety-relevant system redundancy is used to avoid hazardous driving situations.

The assignment of assistance applications to computing nodes is not trivial. The decisions depend on numerous different parameters. By way of example, computing nodes only have limited computing and memory resources. At the same time, each application requires a certain amount of resources in order to function as intended. To ensure that all of the applications can be executed on the computing nodes installed in the vehicle, a multi-dimensional complex application placement problem must be solved.

Hazardous situations caused by software or hardware errors can be avoided (in part), as explained above, through redundant software design. The introduction of redundant assistance applications, however, increases the complexity of the application placement problem, because additional parameters must be taken into account. By way of example, the minimum number of redundant entities can be defined for each application. The minimum degree of hardware segregation can also be defined for each application. These parameters indicate the minimum number of different computing nodes on which the entities of the application must be executed. The number of available control units and the requirements for a minimum hardware segregation with respect to the programs result in a distribution problem.

Because the number of software applications necessary for operating an autonomous vehicle is fairly large (approximately a few hundred applications are involved), there are numerous valid assignments between computing nodes and assistance applications. Not all of these valid assignments are "good," however. In order to select the best possible mapping, an optimization goal must be formulated. The optimization goal can be formulated such that mappings using all the computing nodes that the vehicle is equipped with are preferred. In addition to this optimization goal, numerous other target functions can be imagined that take other criteria into account.

The placement of the application can change frequently while the vehicle is in operation. By way of example, if a computing node or an assistance application malfunctions, it may be necessary to change to a new application placement. Aside from these malfunctions, detection of a potential optimization possibility may also trigger a change to a new application placement.

U.S. Pat. No. 5,550,736 discloses a control system for an airplane, in which all of the safety-relevant functional units are doubled. If one of the systems malfunctions, the redundant system takes over, in order to ensure flight safety.

A method for sending vehicle operating data from a vehicle to a remote monitoring receiver is known from U.S. Pat. No. 8,560,609 that includes the steps of: creating a data connection between the vehicle and the remote monitoring receiver; collecting vehicle operating data from data sources in the vehicle; compressing the vehicle operating data into a data packet using a protocol derived from SNMP; and transferring the data packet via the data connection.

U.S. Pat. No. 9,648,023 discloses a server, a module, or another device in a motor vehicle, which is updated, protected, diagnosed and/or managed to simplify vehicle operation. There is a local control unit for this, which is connected physically or otherwise to the vehicle, and can be used to implement the intended processes.

The driving systems used on self-driving vehicles are normally trained by the manufacturer, using test vehicles. A vehicle equipped with the driving system is normally delivered with a first functional data set that represents the results of the training, and in theory, the functions of the driving system, e.g. a lane keeping assistance, distance control, etc.

SUMMARY

Various technologies and techniques are disclosed herein to increase safety in an autonomously driven motor vehicle, and reduce power consumption, as well as to provide techniques for operating a self-driving vehicle in which a safe and energy-saving operation of the vehicle is ensured.

In one example, a method is disclosed for operating a self-driving motor vehicle that includes numerous control units and numerous program codes for controlling the functions for autonomous driving, as well as any other functions of the self-driving vehicle, wherein numerous program codes used for autonomous driving are applied redundantly to at least two different control units. The self-driving motor vehicle may be operated in an at least partially autonomous driving mode. The functions needed directly for satisfying passenger desires are determined in this mode, and weighted with regard to their significance in satisfying passenger desires. At least one function of a lower order is shut off for this if the available resources in functioning control units and/or the energy level of the self-driving motor vehicle is inadequate to execute a program code for executing this function of the lower order. The program codes are also referred to as applications. The control units may also be referred to as controlling units or computing nodes. This enables a maximum redundancy and energy-efficient control of a (partially) autonomous operation of a motor vehicle by the control system. This increases safety and reduces power consumption, such that the range of the motor vehicle is increased, and the emissions generated by the motor vehicle can be reduced.

Advantageous improvements and non-trivial developments of the method for controlling a motor vehicle given in the respective independent claim are made possible by the features given in the dependent claims.

BRIEF DESCRIPTION OF THE DRAWINGS

The invention shall be explained below in reference to exemplary embodiments, based on the associated drawings. Therein.

DETAILED DESCRIPTION

Figure 1:
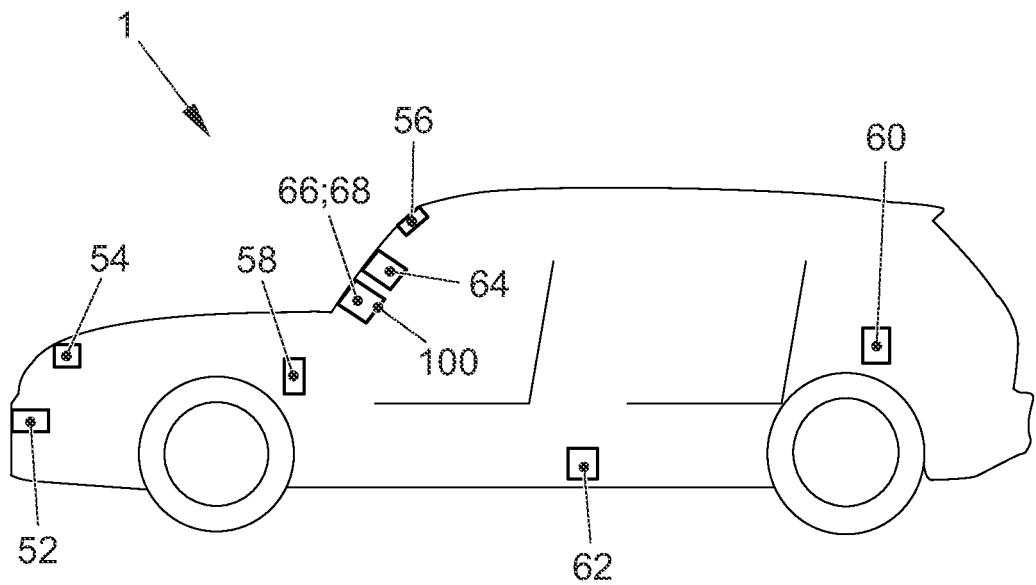
FIG. 1 shows an exemplary schematic illustration of a system according to the present disclosure comprising a motor vehicle according to the present disclosure that has sensors and a control unit for executing an at least partially autonomous operation of the motor vehicle according to some aspects.

In various examples provided herein, control of the motor vehicle may be assumed by a fail-safe system if at least one program code for a function of the highest order can no longer be executed. A fail-safe system can prevent hazardous operating situations for the passengers of the motor vehicle or its immediate environment, even in the event of a total malfunction of the control system for the motor vehicle.

In some examples, the motor vehicle may be brought to a standstill, and/or is steered to the next available safe stopping point, by the fail-safe system. A braking of the motor vehicle to a standstill normally leads to a mitigation of one or more hazardous conditions. In certain driving situations, for example, an unlit tunnel, on a highway, in particular a construction site on a highway, a vehicle standstill could result in a hazardous traffic situation. In this case, the fail-safe system in the motor vehicle may continue to drive until reaching a safe place for the motor vehicle to stop, thus avoiding hazardous traffic situations.

In some examples, a minimum number of redundancies are established for each function. The safety of the control system can be improved by redundancies, because the respective redundant program code can assume the function of a malfunctioning program code.

In some examples, a minimum number of different control units may be established for each function, on which different program codes for controlling the function are redundantly executed. Safety can be further improved by executing program codes on different control units, because if one control unit malfunctions, the program code can be executed by another control unit.

Functions of a higher order may be configured to have more redundancies than the functions of a lower order. As a result of the multiple redundancies of the functions of the higher and highest order, a malfunction in a control unit will not lead to hazardous operating states in traffic, and instead, this malfunction will only be noticed as a reduction in comfort by the passengers of the motor vehicle.

A control system may be configured to define numerous target achievement levels, wherein, if a target achievement falls below a requirement threshold for the second goal achievement level, the fail-safe system may assume control of the motor vehicle. This ensures that even with larger system disruptions of the control system, the passengers in the motor vehicle, or people in the immediate vicinity of the motor vehicle, are not endangered.

In some examples, functions of the highest order may be executed redundantly at least once on different control units.

In some examples, the computing power of the control units may be allocated to controlling respective functions, such that a highest possible target achievement level may be obtained. This may form a basis for a subsequent optimization, in which individual control units are deactivated in order to reduce power consumption when the highest target achievement level has been reached.

The highest target achievement level may be reached thereby in an initial state of the control system. If it is assumed that all of the program code can be reliably and safely executed by the control units in the control system in the initial state, the conditions for reaching the highest target achievement level are then satisfied in this initial state.

In some examples, redundancies of lower-order functions may be reduced, and the computing power freed up by this action can be allocated to the control units for the functions of the higher orders. As a result, the power consumption by the control system can be reduced, and unneeded control units can be deactivated.

In some examples, a method for controlling an autonomously driven motor vehicle is disclosed, where a control system may define a plurality (e.g., five) of different target achievement levels. At a first target achievement level, the functions can only be inadequately mapped, such that the fail-safe system assumes control of the motor vehicle. At a second target achievement level, at least each function of the highest order is executed redundantly once on two different control units. At a third target achievement level, each function of the highest order (38) may be redundantly executed at least once, and the functions of the highest order may be executed separately on at least a plurality (e.g., three) of different control units, and the functions of the second highest order may be at least redundantly executed. At a fourth target achievement level, each function of the highest order may be redundantly executed at least once, and the functions of the highest order may be executed separately on at least four different control units, and the functions of the second highest order and third highest order are executed redundantly at least once. At a fifth target achievement level, all of the functions are executed, wherein the functions of the middle, higher, and highest orders are executed at least redundantly and separately on numerous control units.

Another aspect of the present disclosure relates to a control system, comprising numerous control units, wherein the control system is configured to execute such a method for operating at least partially autonomously driven motor vehicles when numerous machine-readable program codes are executed by at least two control units in the control system.

A vehicle that executes the method according to the present disclosure may also include a driving system configured to operate the vehicle automatically. The driving system may be configured in particular for fully automatic longitudinal and/or lateral control of the vehicle. The driving system preferably accesses a large amount of sensor data acquired by the vehicle, as well as communication data received by the vehicle. The driving system is configured in particular to execute driver assistance functions ranging from partially to fully automated driving. The driving system may contain control algorithms for this, which are at least partially based on machine learning, and contain, for example, target functions and/or neural networks. Function data are therefore also necessary for operating the driving system, which contain, for example, parameters for a neural network, or optimized function parameters. This function data may be stored in the driving system for the vehicle as a function data set. At the start of the method according to the present disclosure, a (relatively) first function data set may always be stored in the driving system for the vehicle.

A vehicle that executes the method according to the present disclosure may also include a control unit. This control unit is preferably configured to communicate with the other components in the vehicle, in particular with the first communication module and with the driving system, as well as with any sensors, and to coordinate their functions. The control unit also preferably contains a memory, or controls such.

In some exemplary configurations, the scope of functions in the driving system increases as the licensing level of the vehicle increases. In other words, the degree of automation operating the vehicle increases as the licensing level of the vehicle increases. The licensing levels of the vehicle correlate to the various levels of autonomous driving. A vehicle therefore has a licensing level 0 in its delivery state. The licensing level 0 also corresponds to an automation degree level 0 ("driver only"), according to which the driver assumes permanent longitudinal and lateral control of the vehicle, and the driving system does not actively intervene in the operation of the vehicle.

In some examples, licensing level 1 may correspond to an automation degree level 1 ("assisted"), according to which the driver assumes permanent longitudinal and lateral control of the vehicle, and the driving system assumes control of the other functions. Licensing level 2 may also correspond to an automation degree level 2 ("partially automated"), according to which a driver must permanently monitor the vehicle, and the driving system assumes longitudinal and lateral control of the vehicle in certain applications.

Licensing level 3 may also correspond to automation degree level 3 ("highly automated"), according to which a driver does not have to permanently monitor the vehicle, but must be able to assume control of the vehicle. According to automation degree level 3, the driving system also assumes longitudinal and lateral control in specific applications, identifies limits of the driving system itself, and requires the driver to assume control with sufficient time to do so. Licensing level 4 may correspond to an automation degree level 4 ("fully automated"), according to which a driver is not needed in a specific application, and the driving system manages the situation fully autonomously in the specific application.

Licensing level 5 also corresponds to an automation degree level 5 ("driverless"), according to which no driver is needed from start to finish, and the driving system fully assumes the role of the driver in all applications. The above definitions correspond to the "five levels of autonomous driving," as defined by the Verband der Deutschen Automobiliindustrie, VDA [EN: Association of the German Automobile Industry]. Applications refer to road types, speed ranges, and environmental or weather conditions.

Another aspect of the present disclosure relates to a vehicle, in particular a passenger automobile with an internal combustion engine, electric motor, or hybrid engine. The vehicle contains sensors at least for collecting environment data, via which the control units in the control system are supplied with data for autonomous driving.

Another aspect of the present disclosure relates to a computer program, comprising program code for executing the steps of such a method for operating an at least partially autonomous motor vehicle, when the program code in the computer program is executed on a computer.

The steps of the method according to the present disclosure can be implemented by electrical or electronic components or elements (hardware), firmware (ASIC), or they can be realized by executing a suitable program (software). The method according to the present disclosure is likewise preferably realized or implemented by a combination of hardware, firmware, and/or software. By way of example, individual components for executing individual steps of the method are configured as separate integrated circuits, or arranged on a shared integrated circuit. Individual components configured to execute individual steps of the method are also preferably arranged on a (flexible) printed circuit board (FPCB/PCB), a tape carrier package (TCP) or some other substrate.

The individual steps of the method according to the present disclosure also preferably form one or more processes that run on one or more processors in one or more electronic computers, and are generated when one or more computer programs are executed. The computers are preferably configured to cooperate with other components, e.g. a communication module, as well as one or more sensors or cameras, in order to realize the functionalities described herein. The instructions of the computer programs are preferably stored in a memory, e.g. an RAM element. The computer programs can also be stored on a non-volatile storage medium, e.g. a CD-ROM, flash memory, etc.

One of ordinary skill in the art should also recognize that the functionalities of numerous computers (data processors) can be combined, or combined to form a single device, or that the functionalities of one data processor can be distributed among numerous devices, in order to execute the steps of the method according to the present disclosure without deviating from the method according to the present disclosure.

The various embodiments of the present disclosure specified in this application can be combined with one another, if not otherwise specified.

FIG. 1 shows a schematic illustration of a block diagram for an exemplary motor vehicle 1, such as an automobile that has an internal combustion engine, an electric motor, or a hybrid engine. The motor vehicle 1 comprises numerous first sensors, in particular a first sensor 52, a second sensor 54, and a third sensor 56. The first sensors 52, 54, 56 are configured to collect environment data for the motor vehicle 1, and include component such as a camera for recording an image of the immediate environment of the vehicle 1, distance sensors, e.g. ultrasonic sensors or LIDAR for detecting distances from the vehicle 1 to surrounding objects. The first sensors 52, 54, 56 send the environment signals they acquire to control units 12, 14, 16, 18 in a control system 10 for the motor vehicle 1.

The motor vehicle 1 may also include numerous second sensors, such as a fourth sensor 58, a fifth sensor 60, and a sixth sensor 62. The second sensors 58, 60, 62 may be configured as sensors for determining relevant status data for the motor vehicle itself 1, e.g. current position and movement information relating to the vehicle. The second sensors may include, for example, speed sensors, acceleration sensors, tilt sensors, sensors for measuring the emersion depth of a bumper, wheel rotation sensors, etc. The second sensors 58, 60, 62 may transmit their status signals to the control units in the motor vehicle 1. In some examples, the second sensors 58, 60, 62 transmit their measurement results to a control unit 12, 14, 16, 18 in the control system 10 for the motor vehicle 1.

The motor vehicle 1 may include a control system 10, which is configured for fully automated driving, in particular autonomous longitudinal and lateral control, of the motor vehicle 1. The control system 10 may include a navigator 64, which is configured to calculate routes between a starting point and a destination, and to determine the maneuvers that are to be executed along this route by the motor vehicle 1. The navigator 64 may be configured to execute specific maneuvers of the motor vehicle 1, e.g. entering and exiting parking spaces. The control system 10 may also include an internal memory 66 that communicates with the navigator 64, e.g. via an appropriate data bus. A model, a neural network, and/or a target function are stored, in particular, on the internal memory 66, which are at least partially based on machine learning. Function data for the model, neural network, or target function are also stored as a function data set in the internal memory 66. The functionality of the control system 10 is preferably controlled by a control unit, and is activated in particular on the basis of the licensing level of the motor vehicle 1.

The control system 10 may be configured to execute the steps of methods disclosed herein in the motor vehicle 1. The control system 10 may execute the methods by means of the control units 12, 14, 15, 18, or activates the other components in the motor vehicle 1 accordingly. Each of the control units 12, 14, 15, 18 may be configured with an internal memory 66 and a CPU 68, which communicate with one another, e.g. via an appropriate data bus. The control units 12, 14, 16, 18 in the control system 10 may also be in communication with at least the first sensors 52, 54, 56 and the second sensors 58, 60, 62, as well as any other control units in the motor vehicle, e.g. for controlling the heater or climate control in the motor vehicle, a radio, navigation system, or other information or entertainment systems. The communication may take place via one or more respective CAN connections, one or more respective SPI connections, or other appropriate data connections, for example.

Figure 2:
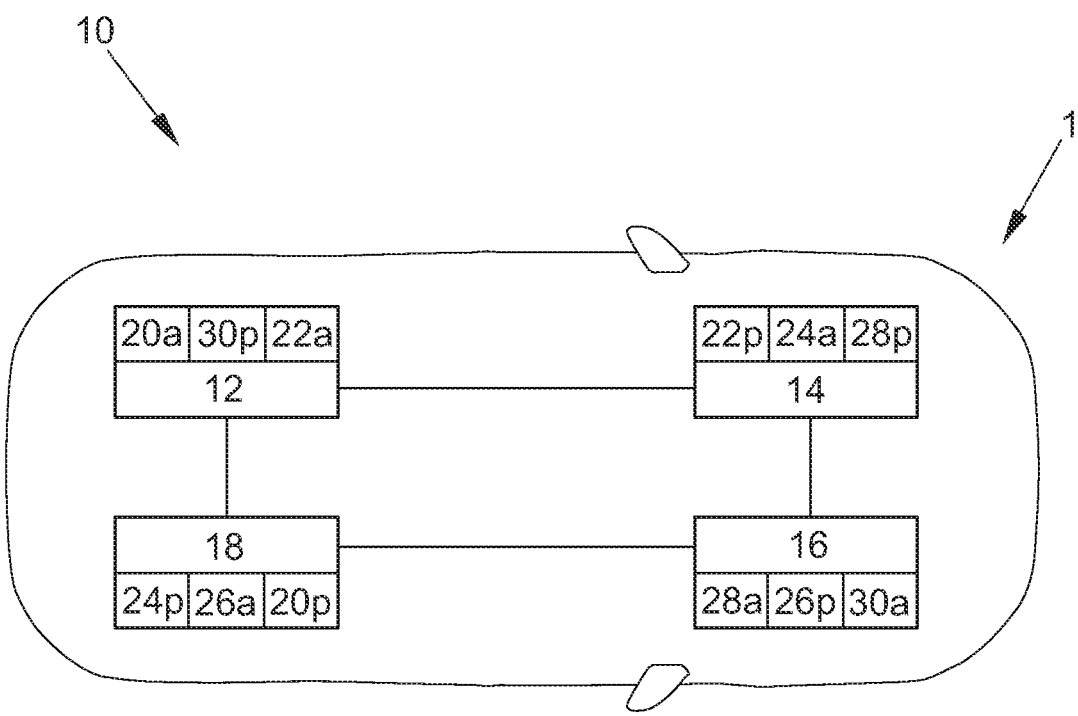
FIG. 2 shows an exemplary control system according to the present disclosure comprising numerous control units, which execute numerous program codes for controlling an at least partially autonomous operation of the motor vehicle according to some aspects.

FIG. 2 shows a schematic configuration of a control system 10 for controlling an at least partially autonomous, preferably fully autonomous, motor vehicle 1. The control system 10 may be configured to include a plurality (e.g., four) control units 12, 14, 15, 18, each of which executes at least one program code 20, 22, 24, 25, 28, 30 for executing a partially autonomous or fully autonomous operation of the motor vehicle 1. Each program code 20, 22, 24, 26, 28, 30 is redundantly applied to two different control units 12, 14, 16, 18. A program code 20a, 22a, 24a, 26a, 28a, 30a is actively executed by a control unit 12, 14, 16, 18 and evaluated for controlling the motor vehicle 1, while the respective redundant programs 20p, 22p, 24p, 26p, 28p, 30p remain passive, and are first integrated in the control of the motor vehicle 1 when a previously active program 20a, 22a, 24a, 26a, 30a can no longer be evaluated for controlling the motor vehicle 1 due to an error or the malfunction of the respective control unit 12, 14, 16, 18.

Figure 3:
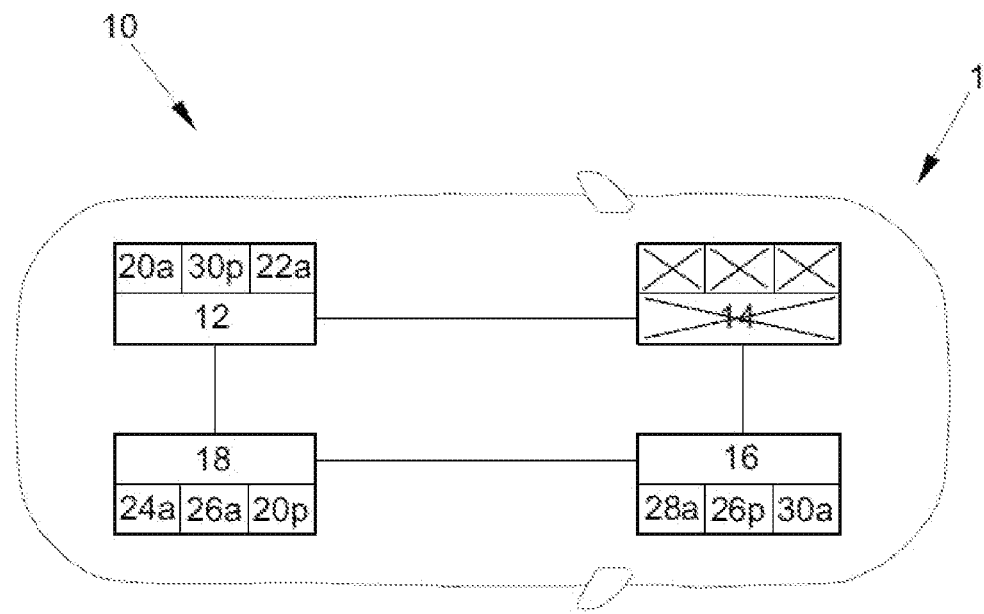
FIG. 3 shows an exemplary control system according to the present disclosure comprising numerous control units, wherein, if a control unit malfunctions, or a program code crashes, the missing function is assumed by a redundant program code on another control unit according to some aspects.

The placement of the program codes 20, 22, 24, 26, 28, 30 can change frequently during operation of a motor vehicle 1. By way of example, after an event such as the malfunction of a control unit 12, 14, 16, 18, or the malfunction of an application, it may be necessary to change to a new application placement. Aside from these events, the identification of an optimization opportunity can also trigger a switch to a new control unit 12, 14, 16, 18. Such a case, in which the second control unit 14 malfunctions, is shown in FIG. 3. A third program code 24a is initially executed by the second control unit 14. After this second control unit 14 malfunctions, or after a crash of the third program code 24a actively executed so far on the second control unit 14, the third program code 24p on the third control unit 16 is activated and evaluated for the ongoing control of the motor vehicle 1. As a result, dramatic driving situations caused by a lack of control of the motor vehicle 1 can be avoided.

To enable an optimization of the active program codes 20a, 22a, 24a, 26a, 28a, 30a, it is necessary to know the current driving situation and the current performance of the control system 10. Reference is made with regard to the system, to the performance of all of the software applications 20, 22, 24, 26, 28, 30, all control units 12, 14, 16, 18, and other hardware, in particular the sensors 52, 54, 56, 58, 60, 62.

The following examples illustrate this dependency.

Assuming that the motor vehicle 1 is an electric automobile driving a passenger to an important meeting, and the battery for the motor vehicle is nearly empty. In such a situation, the goal of arriving punctually at the intended destination is more important than entertaining the passenger. To increase the range of the motor vehicle 1, all applications relating to entertainment can be stopped. Consequently, some control units 12, 14, 16, 18 can be shut down, thus saving energy.

In an illustrative example, a motor vehicle 1 may be stuck in traffic. Because the motor vehicle 1 is hardly moving, redundant entities of driving functions can be stopped. This frees up resources with which an application can be executed that contributes to an improvement in the traffic flow, for example.

Assuming a system crash, half of the control units 12, 14, 16, 18 installed in the motor vehicle may no longer function. Because the remaining control units 12, 14, 16, 18 do not provide enough resources to execute all of the program codes 20, 22, 24, 26, 28, 30 of the applications that were executed before the crash, a new application placement plan must be calculated. The goal of the placement optimization is to map all of the applications that are necessary for bringing the motor vehicle 1 safely to a stop, in order to ensure the safety of the passengers and other road users.

To enable an optimization of the application placement with respect to the current context, a layer is added to the configuration diagram. This layer divides the configuration graphs into numerous target achievement levels 42, 44, 46, 48, 50. The target achievement levels 42, 44, 46, 48, 60 may be defined such that the safety and availability of the system increases as the target achievement levels increase. The target achievement level 50 can therefore be regarded as the "best" target achievement level, meaning that this target achievement level 50 is the most desired. The target achievement level 42 is therefore the "worst" level. Because minimum safety requirements can no longer be satisfied at this level, a fail-safe system must take over control of the motor vehicle 1 and stop it safely.

Characteristics (e.g., minimal redundancy requirements) may be defined for each target achievement level 42, 44, 46, 48, 50, which must fulfill an application placement for these levels. The target achievement levels 42, 44, 46, 48, 50 should also build off one another, i.e., an application placement of the target achievement level x must also fulfill the characteristics necessary for all target achievement levels y, where $1 \leq y < x$. Another criteria that should be taken into account in the definition of the target achievement levels 42, 44, 46, 48, 50 is that edges serving as level boundaries can no longer overlap between two target achievement levels 42, 44, 46, 48, 50 (remember that edges correspond to events). This means that the possibility should be eliminated of an event occurring (e.g. the malfunctioning of a control unit 12, 14, 16, 18) that results in a worsening of the target achievement level 42, 44, 46, 48, 50 by two or more target achievement levels 42, 44, 46, 48, 50. As a result, an event can only cause a worsening to the level beneath the current level, i.e. jumps to numerous target achievement levels 42, 44, 46, 48, 50 are not permitted.

Figure 4:
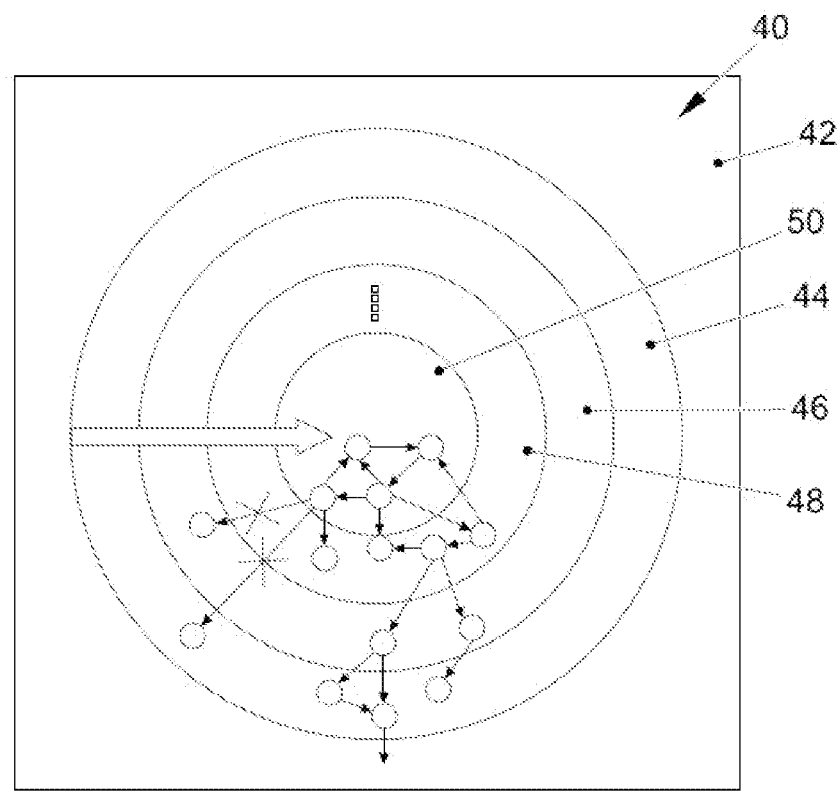
FIG. 4 shows an exemplary flow chart for reaching the highest possible target achievement level when executing the method according to some aspects.

Furthermore, a target function may be defined for each target achievement level 42, 44, 46, 48, 50. As stated above, level N may be configured to be the most desired level. It is therefore the aim of all other target achievement levels 42, 44, 46, 48 to reach the target achievement level N 50 as quickly as possible. This can be achieved through a target function that prioritizes the placement of the executed program codes 20, 22, 24, 26, 28, 30, and fulfills as many characteristics as required by the next target achievement level 44, 46, 48, 50. As soon as target achievement level N 50 has been reached, the application placement can be optimized based on the current driving situation. Such an optimization is illustrated in FIG. 4.

When an application entity malfunctions, the number of entities for the corresponding program codes 20, 22, 24, 26, 28, 30 decreases by 1. If the number of executed program codes 20, 22, 24, 26, 28, 30 is exactly the same as the minimum number of entities necessary for the target achievement level N, the control system 10 is set back to the target achievement level N-1. Otherwise, the system remains at level N, i.e. if the application exceeds the minimum number of necessary entities.

An error in the runtime environment may result in all application entities, executed in the runtime environment, likewise malfunctioning. Because the minimum amount of hardware segregation may be the same as the minimum number of application entities for each executed program code 20, 22, 24, 26, 28, 30, it can be assumed that for applications that correspond precisely to the minimum requirements for the target achievement level N, at most one entity is affected by the runtime environment error. This type of error can therefore be reduced to the malfunctioning of an application entity. As explained above, this approach prevents jumps to numerous target achievement levels 42, 44, 46, 48, 50 if an application entity malfunctions. As a result, multi-level jumps are also prevented in the event of a runtime environment error.

An error in a control unit 12, 14, 16, 18 may result in all of the application entities, executed by this control unit 12, 14, 16, 18, likewise malfunctioning. As stated above, the minimum amount of hardware segregation for each application corresponds to the minimum number of application entities. It can therefore be assumed that for applications that correspond precisely to the minimum requirements for level N, at most one entity is affected by an error in the control unit 12, 14, 16, 18. This type of error can therefore be reduced to the malfunction of the application entity. As a result, multi-level jumps are also prevented in the event of a runtime environment error.

FIG. 5 shows a method according to the present disclosure executed in a motor vehicle 1 that has six control units 12, 14, 16, 18, 70, 72. A total of four different program codes 20, 22, 24, 26 may be executed therein by the control system, wherein the applications belong to the following priority classifications:

highest: first program code 20
high: second program code 22
middle: third program code 24
low: fourth program code 26.

Figure 5A:
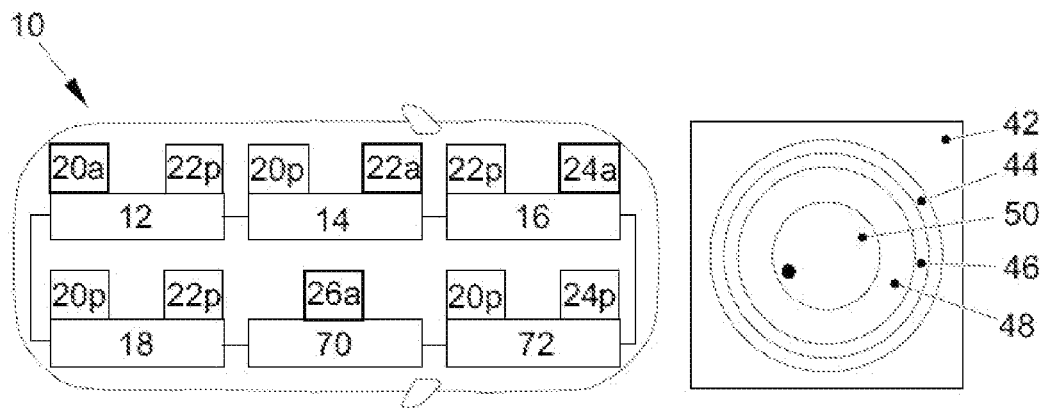
FIGS. 5a-5d show an exemplary visualized vehicle flow chart for reaching the highest possible target achievement level when a program code crashes and/or a control unit malfunctions according to some aspects.
Figure 5B:
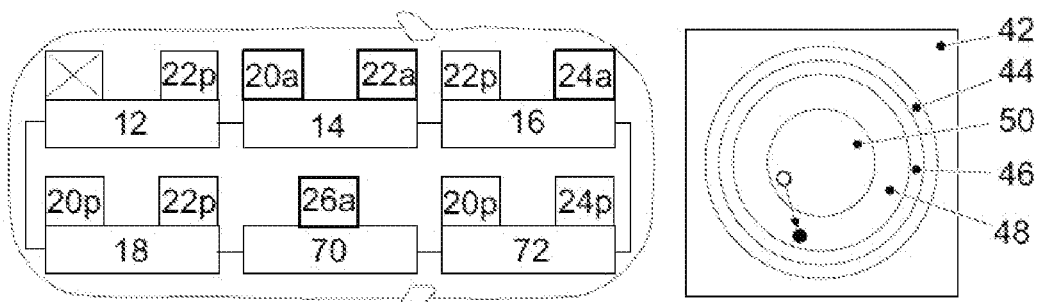
Figure 5C:
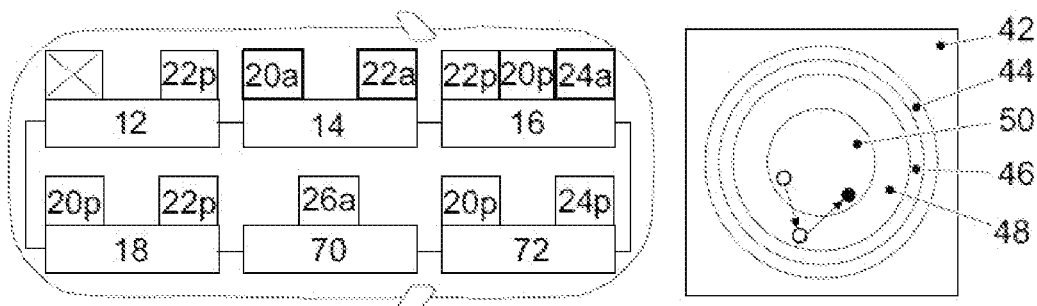

The control system 10 may be in an optimal state in its initial configuration, because it satisfies all of the requirements for the target achievement level 5. It is next assumed, as shown in FIG. 5b, that the active entity of program code 20a malfunctions. By switching to one of the passive entities of program code 20p, a total loss of program code 20 can be avoided.

Because the target achievement level 5 requires that, for each application with the highest priority, the minimum number of entities and the minimum levels of hardware segregation are each four, a malfunction of the active program code 20a means that there are not enough application entities to satisfy the requirements of target achievement level 5. The subsequent configuration is therefore not an element in target achievement level 5, but instead an element in target achievement level 4.

As stated above, the aim of the non-optimal target achievement levels 42, 44, 46, 48 is to execute reset procedures, in order for the control system 10 to reach the highest possible target achievement level 50. As FIG. 5c) shows, the target achievement level 5 can be restored in that a new passive entity 20p of the program code 20 is started.

Figure 5D:
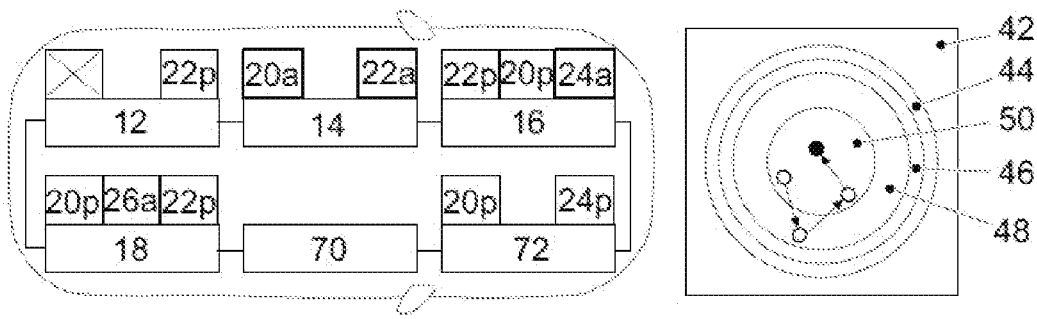

As soon as the control system is restored to target achievement level 5, optimizations based on the current driving situation can be carried out. Assuming that the goal is to increase the range of the vehicle, a change to an application placement that only uses a portion of all of the available control units 12, 14, 16, 18, 20 is preferably used. For this reason, the active entity 26a of program code 26 is displaced to another control unit 18, as shown in FIG. 5d), such that the control unit 70 can be shut down. Aside from this optimization, other energy saving measures can also be carried out, as long as the control system 10 remains at the target achievement level 5.

LIST OF REFERENCE SYMBOLS

1 motor vehicle
10 control system
12 first control unit
14 second control unit
16 third control unit
18 fourth control unit
20 first program code
22 second program code
24 third program code
26 fourth program code
28 fifth program code
30 sixth program code
32 lowest order
34 middle order
36 high order
38 highest order
40 fail-safe system
42 first target achievement level
44 second target achievement level
46 third target achievement level
48 fourth target achievement level
50 first target achievement level
52 first sensor
54 second sensor
56 third sensor
58 fourth sensor
60 fifth sensor
62 sixth sensor
64 navigator
66 internal memory
68 CPU
70 fifth control unit
72 sixth control unit
100 computer program

The invention claimed is:

1. A method for operating a self-driving motor vehicle comprising a plurality of control units and program codes for controlling functions of autonomous driving, wherein the program codes are configured for an autonomous driving mode and are redundantly applied to at least two different control units, the method comprising:
    operating the self-driving motor vehicle in at least a partially autonomous driving mode;
    determining the functions of the self-driving motor vehicle for achieving a target vehicle operation, based on passenger data entry relating to a desired level of one or more vehicle operations;
    classifying the functions into a plurality of orders based on their importance in achieving requirements relating to the passenger data entry;
    determining that (i) available resources for the control units is insufficient for executing program code in a lower order of the plurality of orders, and/or (ii) one or more power levels of the self-driving motor vehicle are insufficient for executing program code in a lower order of the plurality of orders; and
    shutting off at least one function of a lower order, based on the determination of the available resources and/or power levels.

2. The method according to claim 1, further comprising directing control of the motor vehicle by a fail-safe system if at least one program code for fulfilling a function of a highest order of the plurality of orders can no longer be executed.

3. The method according to claim 2, further comprising (i) directing the motor vehicle to a standstill by the fail-safe system, and/or (ii) directing the motor vehicle to a configured location to stop by the fail-safe system.

4. The method according to claim 1, further comprising determining a minimum number of redundancies for each function.

5. The method according to claim 4, further comprising determining a minimum number of different control units for each function, on which the different functions can be executed redundantly.

6. The method according to claim 5, further comprising configuring functions of a higher order to have more redundancies than the functions of a lower order.

7. The method according to claim 1, further comprising defining a plurality of target achievement levels, wherein a fail-safe system assumes control of the motor vehicle if a target achievement level is below a requirement for another target achievement level.

8. The method according to claim 1, further comprising executing each function of a highest order redundantly at least once on different control units, when a highest target achievement level has been reached.

9. The method according to claim 1, further comprising allocating computing power of the control units for the program codes for executing the respective functions such that a highest possible target achievement level is reached.

10. The method according to claim 9, wherein the highest target achievement level is reached in an initial state of the control system.

11. The method according to claim 1, further comprising reducing redundancies of functions in lower orders, and allocating computing power to the control units for functions having higher orders.

12. The method according to claim 1, further comprising defining a plurality of different target achievement levels the control system, comprising one or more of
    (1) functions inadequately mapped at a first target achievement level result in a fail-safe system assuming control of the motor vehicle,
    (2) at least each function of a highest order is executed redundantly once on two different control units at a second target achievement level,
    (3) each function of the highest order is executed redundantly at least once at a third target achievement level, and the functions of the highest order are executed separately on at least three different control units, and functions of a second-highest order are redundantly executed,
    (4) each function of the highest order is executed redundantly at least once at a fourth target achievement level, and the functions of the highest order are executed separately on at least four different control units, and functions of the second-highest order and the third-highest order are executed redundantly at least once, and/or
    (5) all of the functions are executed at a fifth target achievement level, wherein the functions of middle, higher and highest orders are executed at least redundantly and separately on a plurality control units.

13. A system for operating a self-driving motor vehicle, comprising
an autonomous driving system; and
a plurality of control units comprising program codes for controlling functions of autonomous driving, wherein the program codes are configured for an autonomous driving mode and are redundantly applied to at least two different control units, wherein the autonomous driving system and the plurality of control units are configured to
operate the self-driving motor vehicle in at least a partially autonomous driving mode;
determine the functions of the self-driving motor vehicle for achieving a target vehicle operation, based on passenger data entry relating to a desired level of one or more vehicle operations;
classify the functions into a plurality of orders based on their importance in achieving requirements relating to the passenger data entry;
determine that (i) available resources for the control units is insufficient for executing program code in a lower order of the plurality of orders, and/or (ii) one or more power levels of the self-driving motor vehicle are insufficient for executing program code in a lower order of the plurality of orders; and
shut off at least one function of a lower order, based on the determination of the available resources and/or power levels.

14. The system according to claim 13,
wherein the autonomous driving system and the plurality of control units are configured to direct control of the motor vehicle by a fail-safe system if at least one program code for fulfilling a function of a highest order of the plurality of orders can no longer be executed,
and wherein the autonomous driving system and the plurality of control units are configured to (i) direct the motor vehicle to a standstill by the fail-safe system, and/or (ii) direct the motor vehicle to a configured location to stop by the fail-safe system.

15. The system according to claim 13, wherein the autonomous driving system and the plurality of control units are configured to determine a minimum number of redundancies for each function.

16. The system according to claim 13, wherein the autonomous driving system and the plurality of control units are configured to determine a minimum number of different control units for each function, on which the different functions can be executed redundantly.

17. The system according to claim 13, wherein the autonomous driving system and the plurality of control units are configured to configure functions of a higher order to have more redundancies than the functions of a lower order.

18. The system according to claim 13, wherein the autonomous driving system and the plurality of control units are configured to define a plurality of target achievement levels, wherein a fail-safe system assumes control of the motor vehicle if a target achievement level is below a requirement for another target achievement level.

19. The system according to claim 13, wherein the autonomous driving system and the plurality of control units are configured to execute each function of a highest order redundantly at least once on different control units, when a highest target achievement level has been reached.

20. A method for operating a self-driving motor vehicle comprising a plurality of control units and program codes for controlling functions of autonomous driving, wherein the program codes are configured for an autonomous driving mode and are redundantly applied to at least two different control units, the method comprising:
operating the self-driving motor vehicle in at least a partially autonomous driving mode;
determining the functions of the self-driving motor vehicle for achieving a target vehicle operation, based on passenger data entry relating to a desired level of one or more vehicle operations;
classifying the functions into a plurality of orders based on their importance in achieving requirements relating to the passenger data entry;
determining that (i) available resources for the control units is insufficient for executing program code in a lower order of the plurality of orders, and/or (ii) one or more power levels of the self-driving motor vehicle are insufficient for executing program code in a lower order of the plurality of orders;
determining a minimum number of redundancies for each function; and
configuring functions of a higher order to have more redundancies than the functions of a lower order.

* * * * *